(12) United States Patent
Kim (10) Patent No.: US 11,971,150 B2
(45) Date of Patent: Apr. 30, 2024

(54) MOBILE LIGHTING DEVICE AND LIGHTING METHOD FOR VEHICLE

(71) Applicant: HYUNDAI MOBIS CO., LTD., Seoul (KR)

(72) Inventor: Do Hyung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/145,919

(22) Filed: Dec. 23, 2022

(65) Prior Publication Data
US 2023/0400165 A1 Dec. 14, 2023

(30) Foreign Application Priority Data

Jun. 8, 2022 (KR) .................. 10-2022-0069444

(51) Int. Cl.
*F21S 41/63* (2018.01)
*F21S 41/25* (2018.01)
*F21S 41/32* (2018.01)

(52) U.S. Cl.
CPC .............. *F21S 41/635* (2018.01); *F21S 41/25* (2018.01); *F21S 41/32* (2018.01)

(58) Field of Classification Search
CPC ........... F21S 41/635; F21S 41/25; F21S 41/32
See application file for complete search history.

(56) References Cited

U.S. PATENT DOCUMENTS

| | | | |
|---|---|---|---|
| 2012/0300485 A1* | 11/2012 | Lee | F21S 41/675 362/516 |
| 2017/0225607 A1* | 8/2017 | Tachiiwa | B60Q 1/0683 |
| 2018/0313507 A1* | 11/2018 | Wu | F21S 41/663 |

FOREIGN PATENT DOCUMENTS

KR 10-2011-0049295 A 5/2011

* cited by examiner

*Primary Examiner* — Elmito Breval
(74) *Attorney, Agent, or Firm* — NovoTechIP International PLLC (57) ABSTRACT

A mobile lighting device includes a housing unit inserted into a vehicle body, a light source unit mounted in the housing unit and configured to generate light, a lens unit mounted in the housing unit and configured to transmit the light generated in the light source unit, and a drive unit configured to move the housing unit in such a manner that the lens unit is selectively inserted into y or protrudes out of the vehicle body.

20 Claims, 8 Drawing Sheets

MOBILE LIGHTING DEVICE AND LIGHTING METHOD FOR VEHICLE

CROSS-REFERENCE TO RELATED APPLICATIONS

This application claims priority from and the benefit of Korean Patent Application No. 10-2022-0069444, filed on Jun. 8, 2022, which is incorporated herein by reference.

TECHNICAL FIELD

The present disclosure relates to a mobile lighting device and lighting method for a vehicle and, more particularly, to a mobile light fixture capable of providing line illumination in a protruding state whenever necessary.

BACKGROUND

Usually, various lamps are used in a vehicle in order for a driver to clearly send a signal associated with his/her vehicle's traveling to other vehicles. Among these lamps, a rear lamp into which a direction indicating light, a brake light, a rear light, and a backup light are configured to be structurally combined is mounted on the rear of a vehicle.

In recent years, the rear light that forms line light from an edge of the vehicle to the center thereof has been mounted in the vehicle. However, the rear light transfers a planar image. Accordingly, there occurs a problem in that the rear light is that a driver of a following vehicle does not clearly recognize the signal sent. Therefore, there has been a need to solve this problem.

An example of the related art is disclosed in Korean Patent Application Publication No. 2011-0049295 (published on May 12, 2011, and entitled "Rear Combination Lamp and Lighting System Using the Same).

SUMMARY

An object of the present disclosure, which is made in view of the above-mentioned problem, is to provide a mobile lighting and lighting method for a vehicle, the mobile lighting device capable of providing line illumination in a protruding state whenever necessary.

According to an aspect of the present disclosure, there is provided in a mobile lighting device for a vehicle, the mobile lighting device including: a housing unit inserted into a vehicle body; a light source unit mounted in the housing unit and configured to generate light; a lens unit mounted in the housing unit and configured to transmit the light generated in the light source unit; and a drive unit configured to move the housing unit in such a manner that the lens unit is inserted into the vehicle body or protrudes out of the vehicle body.

In the mobile lighting device, the housing unit may be formed in such a manner as to have a length in the leftward-rightward direction of the vehicle body.

In the mobile lighting device, the housing unit may be formed in such a manner as to have a length in the upward-downward direction of the vehicle body.

In the mobile lighting device, when a vehicle starts, the drive unit may be driven and may cause the lens unit to protrude out of the vehicle body.

In the mobile lighting device, in a case where a speed of a traveling vehicle reaches a preset speed, the drive unit may be driven and may cause the lens unit to protrude out of the vehicle body.

In the mobile lighting device, the lens unit may include: a lens line unit mounted in the housing unit and configured to guide line illumination with the light generated in the light source unit; and a lens reflection unit formed on one side of the lens line unit and configured to reflect a portion of light, propagating to an end portion of the lens line unit, toward the other side of the lens line unit.

In the mobile lighting device, the lens unit may further include a lens image unit formed on the other side of the lens line unit and configured to generate an image of light emitted to the vehicle body.

The mobile lighting device may further include an auxiliary illumination unit formed on the vehicle body and configured to reflect light emitted from the lens unit, protruding out of the vehicle body, toward the lateral direction, thereby providing auxiliary illumination.

The mobile lighting device may further include a sealing unit formed on the vehicle body and brought into close contact with the lens unit.

In the mobile light device, the sealing unit may be arranged in such a manner as to surround the lens unit inserted into an insertion groove formed in the vehicle body and configured to prevent introduction of a foreign material into the insertion groove.

In the mobile light device, the housing unit may be positioned on any one or more of front, side, and rear surfaces of the vehicle body.

In the mobile light device, the light source unit may provide red light or white light.

In the mobile light device, when the lens unit is inserted into the vehicle body, the lens unit may not change a flow of air along a surface of the vehicle body.

According to another aspect of the present disclosure, there is provided a mobile light device for a vehicle, the mobile light device including: a housing unit inserted into an insertion groove formed in a vehicle body; a light source unit mounted in the housing unit and configured to generate light; a lens unit mounted in the housing unit and configured to transmit the light generated in the light source unit; and a drive unit built into the insertion groove and configured to drive the housing unit in such a manner as to change a flow of air along a surface of the vehicle body, by adjusting a distance over which the lens unit protrudes, according to a speed of a traveling vehicle.

In the mobile light device, the drive unit may move the housing unit in such a manner that the lens unit protrudes when the vehicle starts to drive.

In the mobile light device, in a case where the speed of the traveling speed reaches a preset speed, the drive unit may move the housing unit in such a manner that the lens unit protrudes.

According to still another aspect of the present disclosure, there is provided a mobile lighting method for a vehicle, the mobile lighting method including: detecting that a vehicle travels; determining whether or not a speed of the traveling vehicle is equal to or higher than a preset speed; and causing a lens unit providing illumination to protrude by a drive unit and thus changing a flow of air along a surface of a vehicle body when the speed of the traveling vehicle is equal to or higher than the preset speed.

In the mobile lighting device and lighting method for a vehicle according to the present disclosure, the housing unit is inserted into the vehicle body, and the light generated in the light source unit mounted in the housing unit passes through the lens unit. Thus, line illumination can be provided. Whenever necessary, the drive unit causes the lens unit to protrude from the vehicle body. Thus, three-dimensional illumination can be provided.

DETAILED DESCRIPTION

A mobile lighting device and lighting method for a vehicle according to an embodiments of the present disclosure will be described below with reference to the accompanying drawings. For clarity and convenience in description, thicknesses of lines, sizes of constituent elements, and the like may be illustrated in non-exact proportion in the drawings. In addition, a term defined by considering a function of a constituent element according to the present disclosure to which the term is assigned will be used below and may vary according to a user's intention or a manager's intention or based on practices in the art. Therefore, the term should be defined in light of the details of the present disclosure disclosed throughout the present specification.

Figure 1:
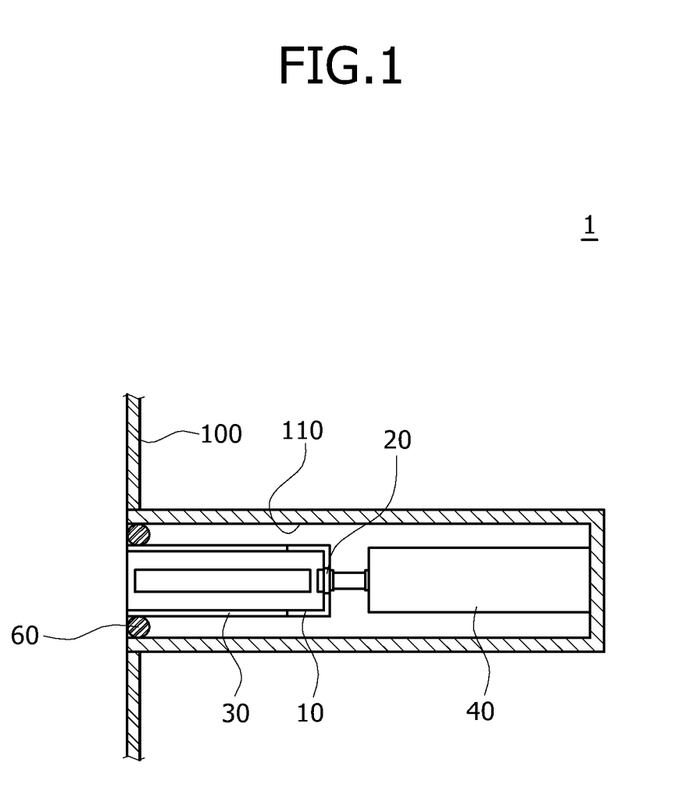
FIG. 1 is a view schematically illustrating a mobile lighting device for a vehicle according to an embodiment of the present disclosure.

FIG. 1 is a view schematically illustrating a mobile lighting device for a vehicle according to an embodiment of the present disclosure. With reference to FIG. 1, a mobile lighting device 1 for a vehicle according to the embodiment of the present disclosure includes a housing unit 10, a light source unit 20, a lens unit 30, and a drive unit 40.

The housing unit 10 is inserted into a vehicle body 100. As an example, the housing unit 10 may be positioned at various points on front, side, and rear surfaces of the vehicle body 100. The mobile lighting device 1 for a vehicle will be described below on the assumption that the housing unit 10 is arranged on the rear surface of the vehicle body 100.

An insertion groove 110 may be formed in the rear of the vehicle body 100, and the housing unit 10 may be inserted into the insertion groove 110. The housing unit 10 may be slidably moved along a rail formed in the insertion groove 110. The housing unit 10 may be open at the rear surface thereof exposed toward the direction of the rear of the vehicle body 100.

The light source unit 20 is mounted in the housing unit 10 and generates light. As an example, one or more light source units 20 may be mounted, in the lengthwise direction of the housing unit 10, on a front end portion of the housing unit 10. That is, a plurality of light source units 20 may be spaced a distance apart in the lengthwise direction of the housing unit 10 and may emit light. Alternatively, one light source unit 20 may emit light using a light guide.

The lens unit 30 is mounted in the housing unit 10 and transmits light generated by the light source unit 20. As an example, the lens unit 30 may guide straight propagation of the light generated by the light source unit 20 and may guide propagation of the light toward the vehicle rear or side portion. The light source unit 20 may provide red light or white light. A separate complementary color lens may be arranged on the lens unit 30 and thus may change a light color. The lens unit 30 may include an inner lens unit and an outer lens unit that is formed in such a manner as to surround the inner lens unit and thus protects the inner lens unit. The inner lens unit may spread out the light generated by the light source 20. The light passing through the inner lens unit may pass through the outer lens unit, and thus the light source 20 may provide illumination to the outside. According to the present disclosure, various design changes are possible in such a manner that the lens unit 30 is mounted in the housing unit 10 and transmits the light generated by the light source unit 20 toward the outside. The lens unit 30 is briefly illustrated in the drawings in such a manner that a basic function thereof is derived, and the lens unit 30 is briefly described under DETAILED DESCRIPTION.

The drive unit 40 moves the housing unit 10 in such a manner that the lens unit 30 is selectively inserted into the vehicle body 100 or protrudes from the vehicle body 100. As an example, the drive unit 40 may be built into the insertion groove 110 and may be combined with the front end portion of the housing unit 10. When electric power is applied, the drive unit 40 may vary in length and may cause the lens unit 30 to protrude out of the vehicle body 100 or may cause the lens unit 30 to be inserted into the insertion groove 110. That is, when the drive unit 40 is lengthened, the lens unit 30 may protrude out of the vehicle body 100. Conversely, when the drive unit 40 is shortened, the lens unit 30 may be inserted into the insertion groove 110.

In a case where the lens unit 30 is inserted into the insertion groove 110, a rear end portion of the lens unit 30 is exposed to the outside. However, the rear end portion of the lens unit 30 is arranged on the same line as the vehicle body 100 and thus does not change a flow of air along a surface of the vehicle body 100 of a vehicle that is traveling. Conversely, in a case where the drive unit 40 causes the lens unit 30 to protrude out of the insertion groove 110, the lens unit 30 protrudes from the vehicle body 100 and thus may serve as a spoiler that changes the flow of air along the surface of the vehicle body 100 of the vehicle that is traveling.

The drive unit 40 may adjust a distance over which the lens unit 30 protrudes, according to a speed of a traveling vehicle. When the lens unit 30 protrudes from the vehicle body 100, the flow of air along the surface of the vehicle body 100 may be changed by the protruding lens unit 30.

Figure 2:
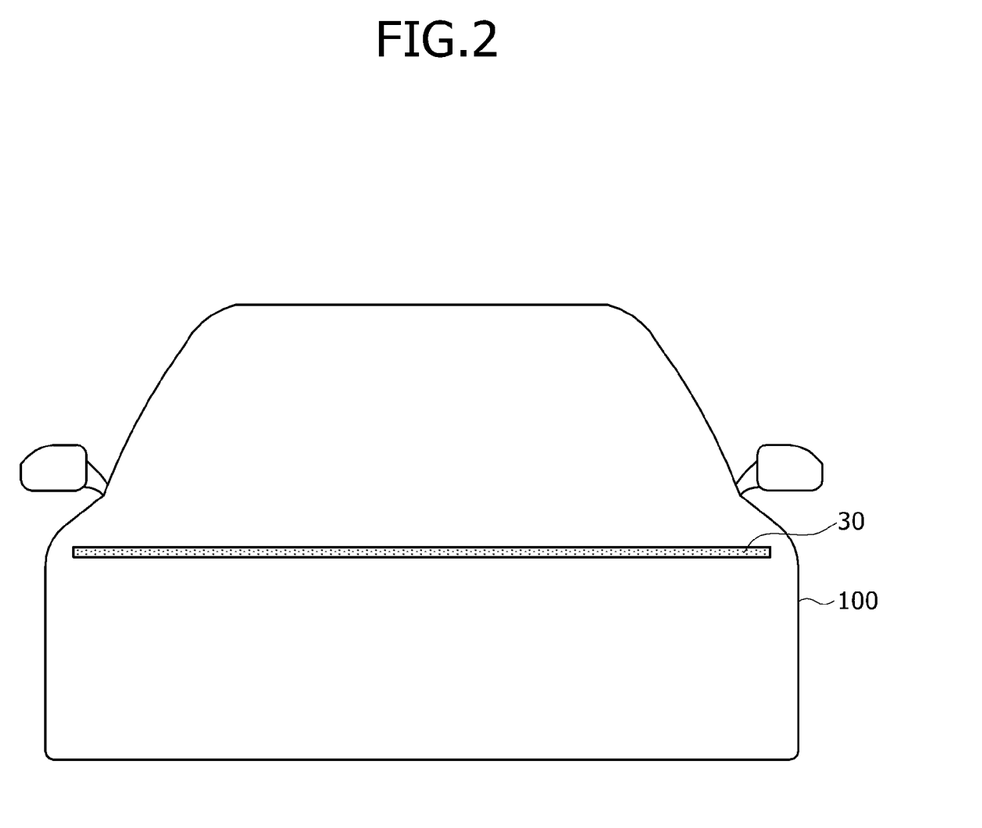
FIG. 2 is a view schematically illustrating a state where the mobile lighting device for a vehicle according to the embodiment of the present disclosure has a length in the leftward-rightward direction of a vehicle body.
Figure 3:
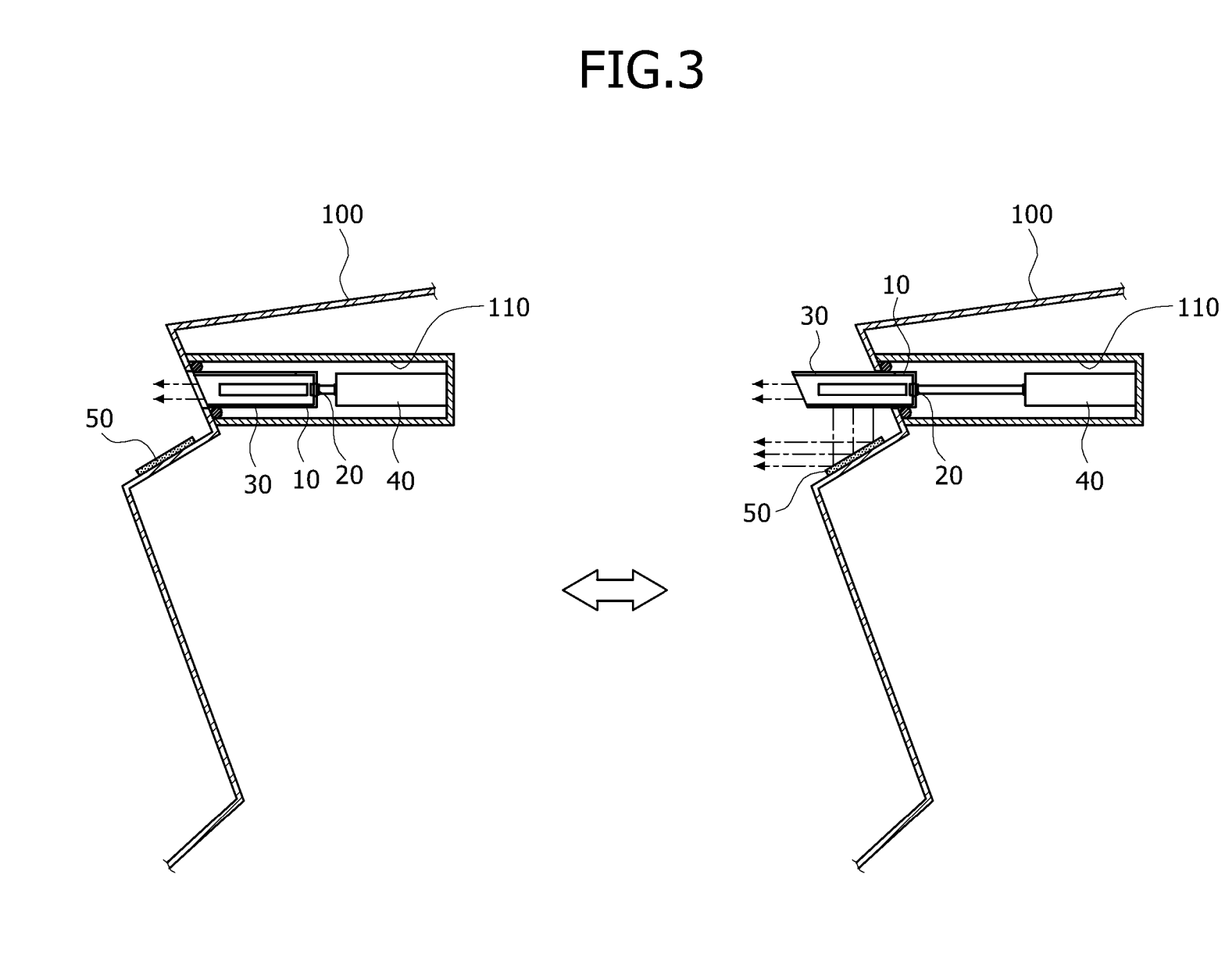
FIG. 3 is a view schematically illustrating a state where, in FIG. 2, a lens unit is arranged by a drive unit.

FIG. 2 is a view schematically illustrating a state where the mobile lighting device 1 for a vehicle according to the embodiment of the present disclosure has a length in the leftward-rightward (i.e., horizontal) direction of the vehicle body 100. FIG. 3 is a view schematically illustrating a state where, in FIG. 2, the lens unit 30 is arranged by the drive unit 40. With reference to FIGS. 2 and 3, the housing unit 10 is formed in such a manner as to extend longitudinally in the leftward-rightward direction with respect to the vehicle body 10. As an example, the housing unit 10 is arranged in the insertion groove 110 that is formed in the lengthwise leftward-rightward direction of a trunk door, and the lens unit 30 that is combined with a rear end portion of the housing unit 10 is exposed to the outside. Thus, line illumination can be provided.

Depending on whether or not the drive unit 40 is driven, the lens unit 30 may be arranged on the same line as the vehicle body 100, or the lens unit 30 may protrude from the vehicle body 100. More specifically, the drive unit 40 may be driven when the vehicle starts and may cause the lens unit 30 to protrude out of the vehicle body 100. In addition, in a case where a speed of a traveling vehicle reaches a preset speed, the drive unit 40 may be driven. Thus, the drive unit 40 may cause the lens unit 30 to protrude out of the vehicle body 100 and may realize a spoiler function.

Figure 4:
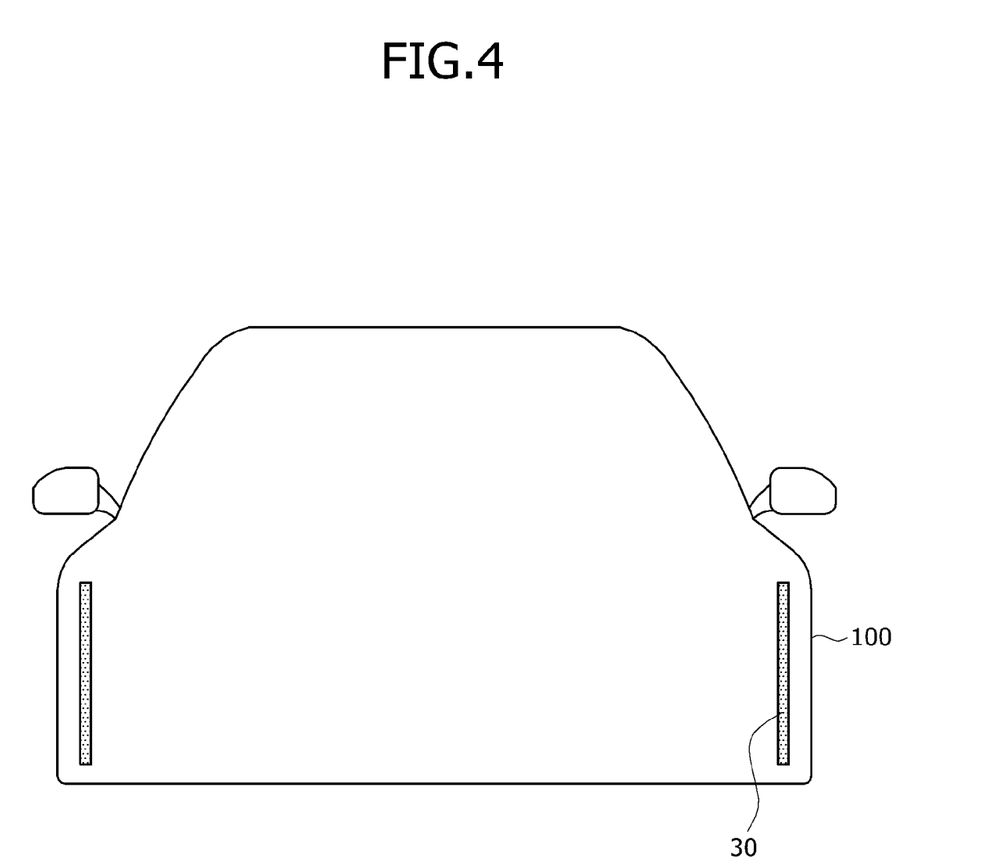
FIG. 4 is a view schematically illustrating a state where the mobile lighting device for a vehicle according to the embodiment of the present disclosure has a length in the upward-downward direction of the vehicle body.
Figure 5:
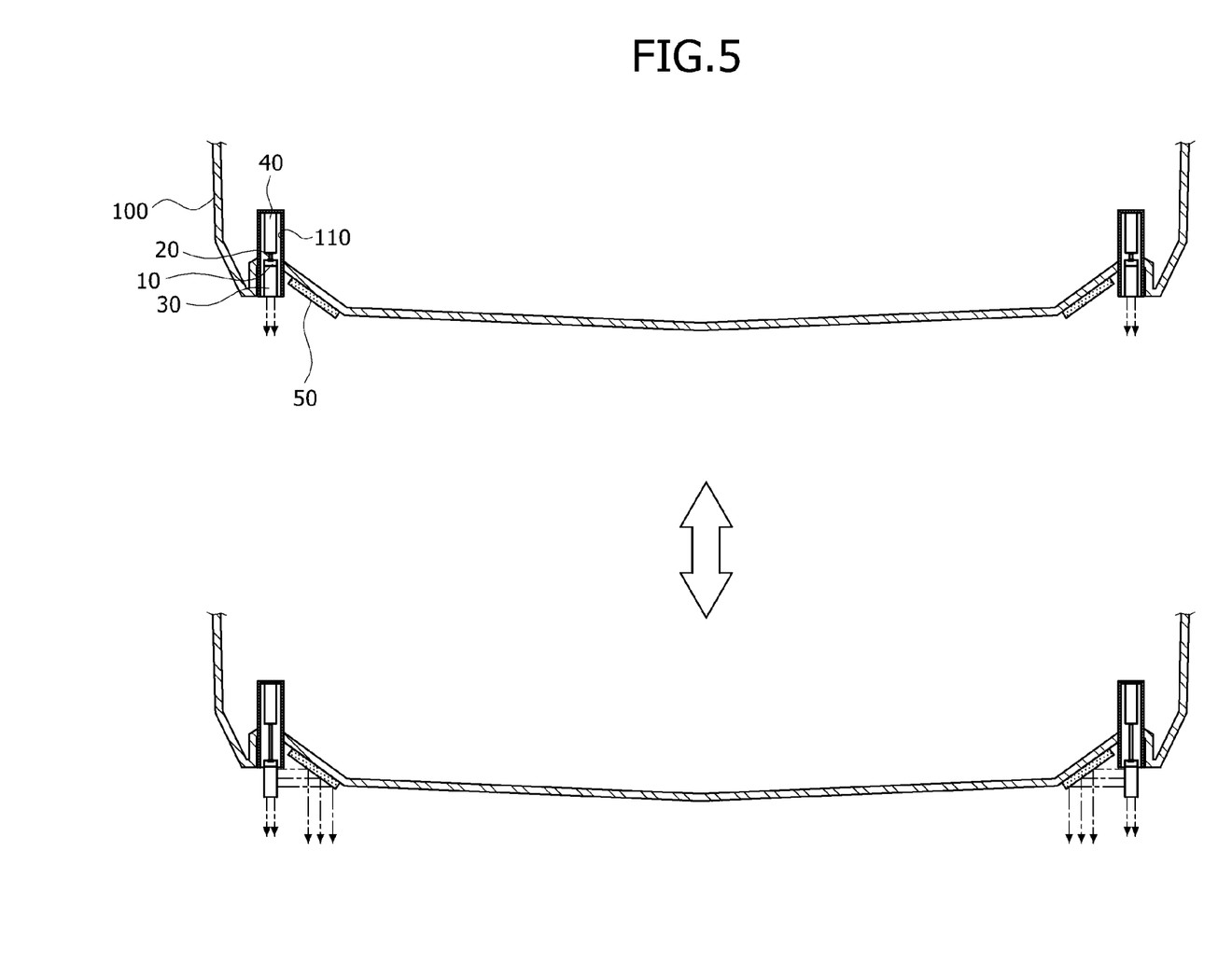
FIG. 5 is a view schematically illustrating a state where, in FIG. 4, the lens unit is arranged by the drive unit.

FIG. 4 is a view schematically illustrating a state where the mobile lighting device 1 for a vehicle according to the embodiment of the present disclosure has a length in the upward-downward (i.e., vertical) direction with respect to the vehicle body 100. FIG. 5 is a view schematically illustrating a state where, in FIG. 4, the lens unit 30 is arranged by the drive unit 40. With reference to FIGS. 4 and 5, the housing unit 10 is formed in such a manner as to have the length in the upward-downward direction of the vehicle body 10. As an example, the housing unit 10 may be arranged in one pair of the insertion grooves 110 that are formed in the lengthwise upward-downward direction on left and right sides, respectively, of the rear of the vehicle, and the lens unit 30 that is combined with the rear end portion of the housing unit 10 is exposed to the outside. Thus, the line illumination can be provided.

Depending on whether or not the drive unit 40 is driven, the lens unit 30 may be arranged on the same line as the vehicle body 100, or the lens unit 30 may protrude from the vehicle body 100. More specifically, the drive unit 40 may be driven when the vehicle starts and may cause the lens unit 30 to protrude out of the vehicle body 100. In addition, in the case where the speed of the traveling vehicle reaches the preset speed, the drive unit 40 may be driven. Thus, the drive unit 40 may cause the lens unit 30 to protrude out of the vehicle body 100 and may realize the spoiler function.

Figure 6:
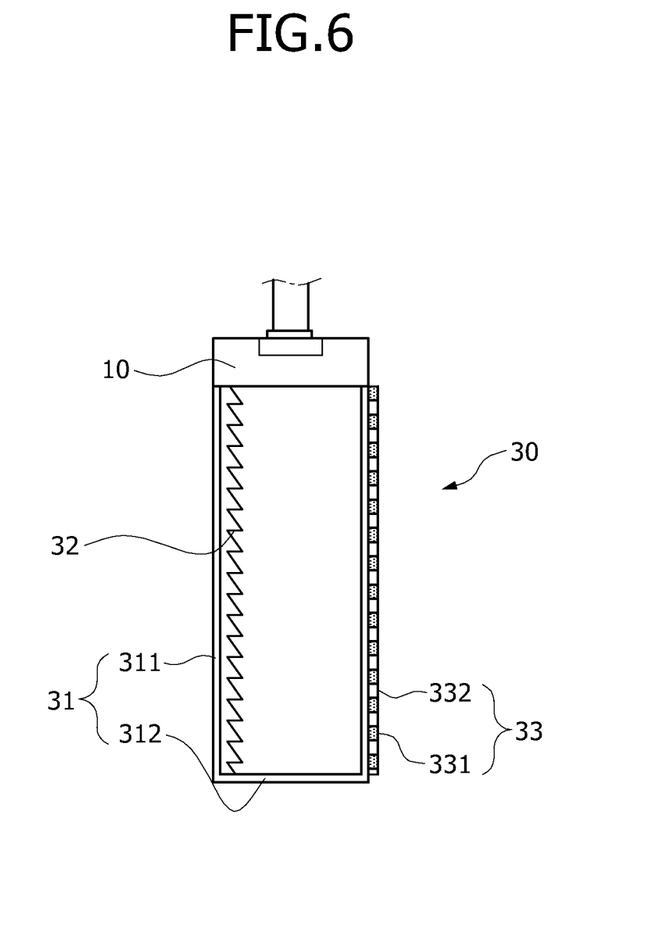
FIG. 6 is a view schematically illustrating the lens unit according to the embodiment of the present disclosure.

FIG. 6 is a view schematically illustrating the lens unit 30 according to the embodiment of the present disclosure. With reference to FIG. 6, the lens unit 30 according to the embodiment of the present disclosure includes a lens line unit 31 and a lens reflection unit 32.

The lens line unit 31 is mounted in the housing unit 10 and guides the line illumination with the light that is generated by the light source unit 20. As an example, the lens line unit 31 is formed in such a manner that a region thereof that is exposed to the vehicle body 100 has a length in the upward-downward or leftward-rightward direction. Thus, the line illumination can be provided. The lens line unit 31 may include a line guide portion 311 and a line transmission portion 312. The line guide portion 311 is mounted in the housing unit 10 and guides the light generated by the light source unit 20. The line transmission portion 312 is formed in a rear end portion of the line guide portion 311 and transmits the light.

The lens reflection unit 32 is formed on one side of the lens line unit 31 and reflects a portion of light, propagating to an end portion of the lens line unit 31, toward the other side of the lens line unit 31. As an example, the lens reflection unit 32 may be formed by machining or by molding in such a manner as to positioned on one lateral surface of the line guide portion 311. The lens reflection unit 32 may guide light according to the working principle of a negatively dot-patterned light guide plate, and may have a staircase-shaped reflection surface. In addition, the lens reflection unit 32 may employ various structures or machining methods for guiding a portion of light, propagating through the line guide portion 311 laterally.

The lens unit 30 according to the embodiment of the present disclosure further includes a lens image unit 33. The lens image unit 33 is formed on the other side of the lens line unit 31 and generates an image of light that is emitted to the vehicle body 100. As an example, the lens image unit 33 may be formed by machining or by molding in such a manner as to be positioned on the other lateral surface of the line guide portion 311, or the lens image unit 33 may be attached to the other lateral surface of the line guide portion 311. The lens image unit 33 may include a lens transmission portion 331 and a lens blocking portion 332. The lens transmission portion 331 transmits light. The lens blocking portion 332 is formed on or attached to the lens transmission portion 331 and blocks transmission of light. Accordingly, light may pass only through the lens transmission portion 331 and may express a preset pattern or shape.

Figure 7:
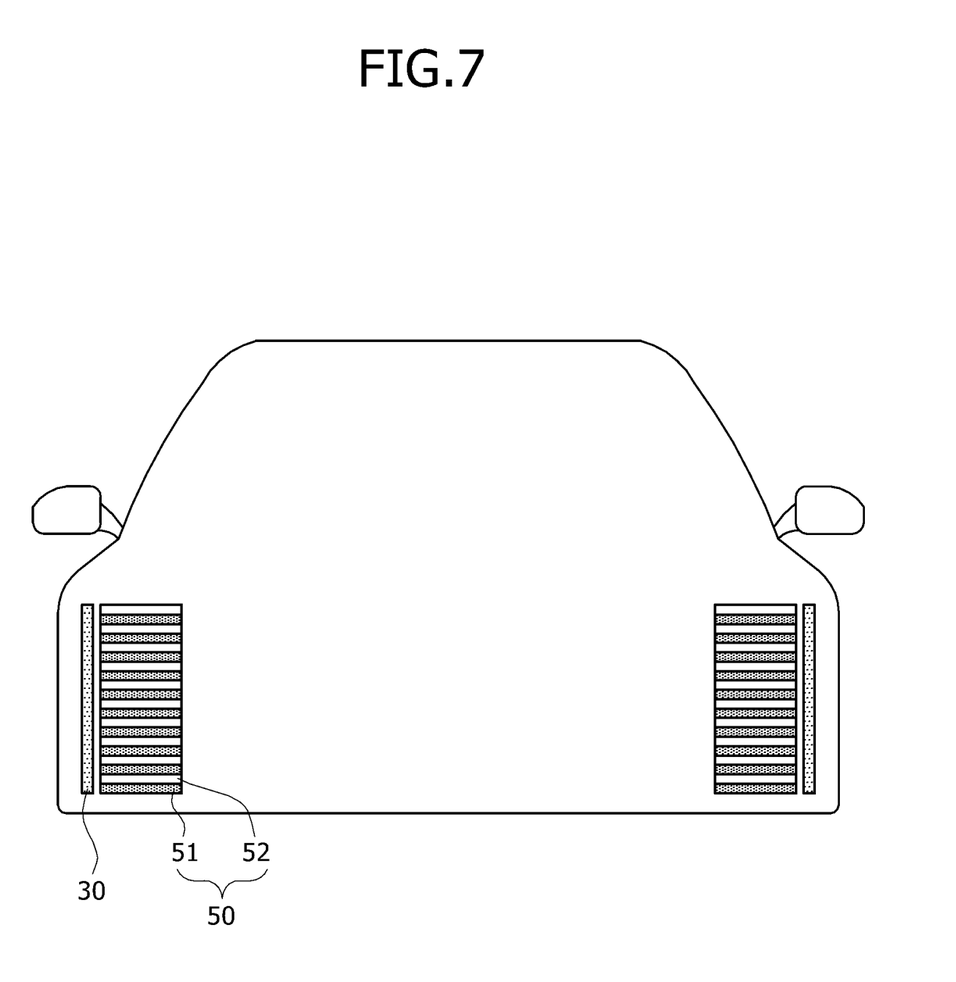
FIG. 7 is a view schematically illustrating an auxiliary illumination unit according to the embodiment of the present disclosure.

FIG. 7 is a view schematically illustrating an auxiliary illumination unit according to the embodiment of the present disclosure. With reference to FIGS. 3, 5, and 7, the mobile lighting device 1 for a vehicle according to the embodiment of the present disclosure may further include an auxiliary illumination unit 50. The auxiliary illumination unit 50 is formed on the vehicle body 100 and reflects light that is emitted laterally, from the lens unit 30 that protrudes out of the vehicle body 100, thereby providing auxiliary illumination.

As an example, the auxiliary illumination unit 50 may be integrally formed with the vehicle body 100 or may be attached to the vehicle body 100. Thus, the light that is emitted from the lens unit 30 may be reflected toward the rear of the vehicle. The auxiliary illumination unit 50 may include an auxiliary reflection portion 51 and an auxiliary blocking portion 52. The auxiliary reflection portion 51 reflects light, and the auxiliary blocking portion 52 blocks reflection of light. The auxiliary blocking portion 52 may be formed on the vehicle body 100 or attached to the auxiliary reflection portion 51, separately from the auxiliary reflection portion 51. Accordingly, light may be reflected only by the auxiliary reflection portion 51, and thus the auxiliary illumination may be provided in the preset pattern or shape.

With reference to FIG. 1, the mobile lighting device 1 for a vehicle according to the embodiment of the present disclosure may further include a sealing unit 60. The sealing unit 60 is formed on the vehicle body 100 and is brought in close contact with the lens unit 30. As an example, the sealing unit 60 may be mounted in the insertion groove 110 and may be arranged in such a manner as to surround the lens unit 30. The sealing unit 60 may be manufactured of an elastic material. The sealing unit 60 may seal up a space between the insertion groove 110 and the lens unit 30, may prevent erroneous movement of the lens unit 30 due to introduction of a foreign material, and may block generation of turbulence due to an air inflow.

Operation of the mobile lighting device 1 for a vehicle according to the embodiment of the present disclosure that has the structure described above is described as follows.

The housing unit 10 is inserted into the insertion groove 110 that is formed in the vehicle body 100, and the light source unit 20 is mounted in the housing unit 10. The lens unit 30 that is combined with the housing unit 10 transmits the light generated by the light source unit 20 and provides the illumination.

The lens unit 30 is inserted by the drive unit 40 into the insertion groove 110 in such a manner as to be arranged on the same line as the vehicle body 100. In a case where the vehicle starts or where the speed of the traveling vehicle reaches the preset speed, the drive unit 40 is automatically driven. Thus, the lens unit 30 protrudes from the vehicle body 100 and provides three-dimensional line illumination.

At this point, light that is emitted laterally from the lens unit 30 may be reflected on the auxiliary illumination unit 50, and thus the auxiliary illumination may be provided.

Figure 8:
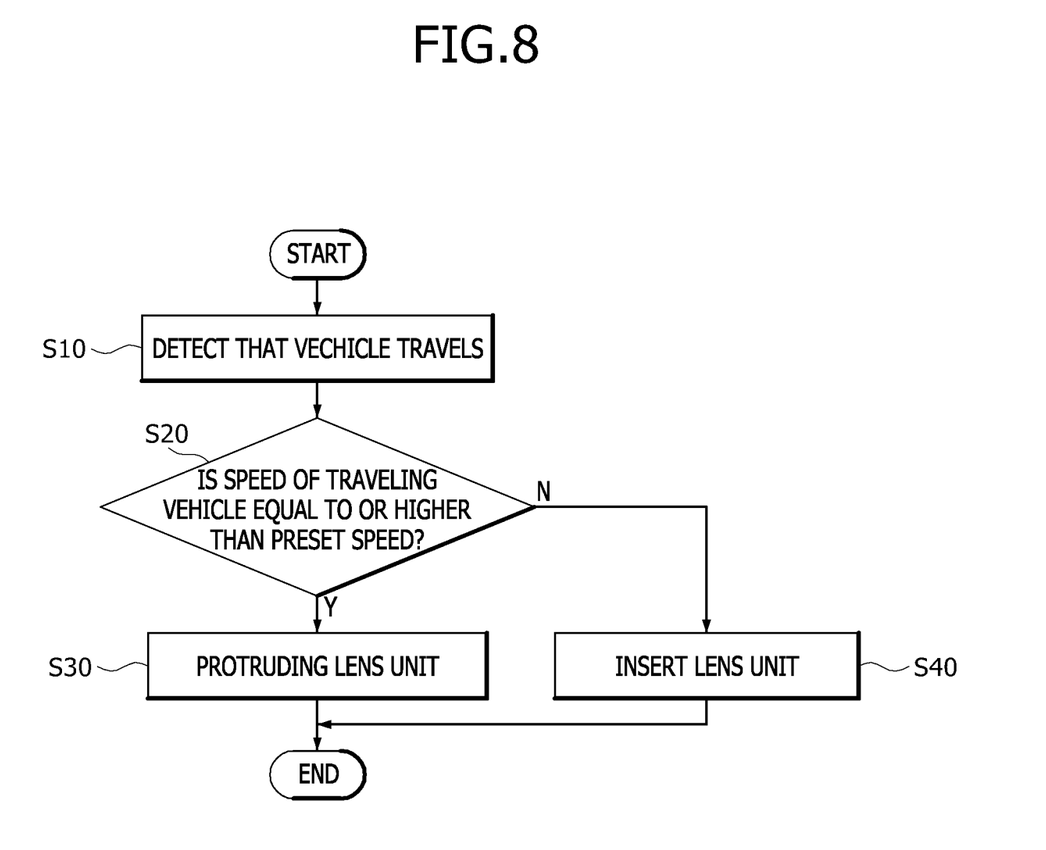
FIG. 8 is a flowchart schematically illustrating a mobile lighting method for a vehicle according to another embodiment of the present disclosure.

FIG. 8 is a flowchart schematically illustrating a mobile lighting method for a vehicle according to another embodiment of the present disclosure. The mobile lighting method for a vehicle will be described as follows with reference to FIG. 8.

In a traveling detection step S10, it may be detected that the vehicle travels. As an example, a traveling detection sensor may detect the speed of the traveling vehicle. At this point, the drive unit 40 may be built into the insertion groove 110 in the vehicle body 100. The drive unit 40 may be combined with the housing unit 10, the light source unit 20 may be mounted in the housing unit 10, and the lens unit 30 that is combined with the housing unit 10 may transmit light that is generated in the light source unit 20. The lens unit 30 is kept inserted into the inserting groove 110, and thus does not change the flow of air along the surface of the vehicle body 100.

In a speed determination step S20, it may be determined whether or not the speed of the traveling vehicle is equal to or higher than a preset speed. As an example, the traveling detection sensor may detect whether or not the vehicle reaches the preset speed.

In a lens-unit protrusion step S30, the lens unit 30 may protrude. That is, when the speed of the traveling vehicle is equal to or higher than the present speed, the lens unit 30 providing illumination protrudes by the drive unit 40, and thus the flow of air along the surface of the vehicle body 100 may be changed. As an example, when the speed of the traveling vehicle reaches the preset speed, a length of the drive unit 40 is increased, thereby moving the housing unit 10. Thus, the lens unit 30 that is combined with the housing unit 10 may protrude toward the outside. The lens unit 30 protruding out of the vehicle body 100 may change the flow of air in such a manner that the vehicle body 100 is stably positioned.

In a lens-unit insertion step S40, the lens unit 30 may be inserted. That is, in a case where the speed of the traveling vehicle does not reach the preset speed, the lens unit 30 providing illumination may be inserted into the insertion groove 110 by the drive unit 40. As an example, in a case where the speed of the traveling vehicle falls short of the preset speed, the length of the drive unit 40 is decreased, thereby moving the housing unit 10. Thus, the lens unit 30 that is combined with the housing unit 10 is inserted into the insertion groove 110, and thus does not change the flow of air along the surface of the vehicle body 100. In a state where the lens unit 30 is in a protruding state, in a case where the speed of the traveling vehicle does not reach the preset speed, the drive unit 40 may be drive in order to insert the lens unit 30. Conversely, in a state where the lens unit 30 is in an inserted state, in a case where the speed of the traveling vehicle does not reach the preset speed, the drive unit 40 is not driven.

In the mobile lighting device 1 for a vehicle according to the embodiment of the present disclosure, the housing unit 10 is inserted into the vehicle body 100, and the light generated by the light source unit 20 that is mounted in the housing unit 10 passes through the lens unit 30. Thus, the line illumination is provided. Whenever necessary, the drive unit 40 causes the lens unit 30 to protrude from the vehicle body 100. Thus, the three-dimensional illumination can be provided.

The embodiment of the disclosure is described only in an exemplary manner with reference to the drawings. It would be understandable to a person of ordinary skill in the art to which the present disclosure pertains that various modifications may possibly be made to the embodiments and that various equivalents thereof may possibly be implemented. Therefore, the proper technical scope of the present disclosure should be defined by the following claims.

What is claimed is:

1. A mobile lighting device for a vehicle, the mobile lighting device comprising:
   a housing unit inserted into a vehicle body;
   a light source unit mounted in the housing unit and configured to generate light;
   a lens unit mounted in the housing unit and configured to transmit the light generated by the light source unit; and
   a drive unit configured to move the housing unit in such a manner that the lens unit selectively inserts into or protrudes from the vehicle body.

2. The mobile lighting device of claim 1, wherein the housing unit extends longitudinally in a horizontal direction with respect to the vehicle body.

3. The mobile lighting device of claim 1, wherein the housing unit extends longitudinally in a vertical direction with respect to the vehicle body.

4. The mobile lighting device of claim 1, wherein, when the vehicle starts, the drive unit causes the lens unit to protrude out of the vehicle body.

5. The mobile lighting device of claim 1, wherein, when speed of the vehicle reaches a preset speed, the drive unit causes the lens unit to protrude out of the vehicle body.

6. The mobile lighting device of claim 1, wherein the housing unit is within an insertion groove formed in the vehicle body, the drive unit built into the insertion groove is combined with a front end portion of the housing unit, and when the drive unit is lengthened, the lens unit protrudes out of the vehicle body.

7. The mobile lighting device of claim 1, wherein the lens unit comprises:
   a lens line unit mounted in the housing unit and configured to guide line illumination with the light generated by the light source unit; and
   a lens reflection unit formed on one side of the lens line unit and configured to reflect a portion of light, propagating to an end portion of the lens line unit, toward another side of the lens line unit.

8. The mobile lighting device of claim 7, wherein the lens unit further comprises:
   a lens image unit formed on the other side of the lens line unit and configured to generate an image of light emitted to the vehicle body.

9. The mobile lighting device of claim 8, wherein the lens image unit comprises:
   a lens transmission portion formed on the other side of the lens line unit and configured to transmit light; and
   a lens blocking portion formed on or attached to the lens transmission portion and configured to block transmission of light.

10. The mobile lighting device of claim 1, further comprising:
    an auxiliary illumination unit arranged on the vehicle body and configured to reflect light emitted from the lens unit, and protruding out of the vehicle body laterally, thereby providing auxiliary illumination.

11. The mobile lighting device of claim 10, wherein the auxiliary illumination unit comprises:
an auxiliary reflection portion on the vehicle body and configured to reflect the light emitted from the lens unit toward the rear of the vehicle body; and
an auxiliary blocking portion attached to the auxiliary reflection portion or formed on the vehicle body and configured to block reflection of light.

12. The mobile lighting device of claim 1, further comprising:
a sealing unit on the vehicle body and brought into close contact with the lens unit.

13. The mobile lighting device of claim 12, wherein the sealing unit is arranged in such a manner as to surround the lens unit inserted into an insertion groove formed on the vehicle body and configured to prevent introduction of a foreign material into the insertion groove.

14. The mobile light device of claim 1, wherein the housing unit is positioned on any one or more of front, side, and rear surfaces of the vehicle body.

15. The mobile light device of claim 1, wherein the light source unit provides red light or white light.

16. The mobile light device of claim 1, wherein, when the lens unit is inserted into the vehicle body, the lens unit does not change a flow of air along a surface of the vehicle body.

17. A mobile light device for a vehicle, the mobile light device comprising:
a housing unit inserted into an insertion groove formed in a vehicle body;
a light source unit mounted in the housing unit and configured to generate light;
a lens unit mounted in the housing unit and configured to transmit the light generated in the light source unit; and
a drive unit built into the insertion groove and configured to drive the housing unit in such a manner as to change a flow of air along a surface of the vehicle body, by adjusting a distance over which the lens unit protrudes, according to a speed of a traveling vehicle.

18. The mobile light device of claim 17, wherein the drive unit moves the housing unit in such a manner that the lens unit protrudes when the vehicle starts to drive.

19. The mobile light device of claim 17, wherein, in a case where the speed of the traveling speed reaches a preset speed, the drive unit moves the housing unit in such a manner that the lens unit protrudes.

20. A mobile lighting method for a vehicle, the mobile lighting method comprising:
detecting that a vehicle travels;
determining whether or not a speed of the traveling vehicle is equal to or higher than a preset speed; and
causing a lens unit providing illumination to protrude by a drive unit and thus changing a flow of air along a surface of a vehicle body when the speed of the traveling vehicle is equal to or higher than the preset speed.

* * * * *